March 25, 1969     T. R. DEMYON     3,434,346
RADIATOR SIGHT GAUGES
Filed Nov. 30, 1966
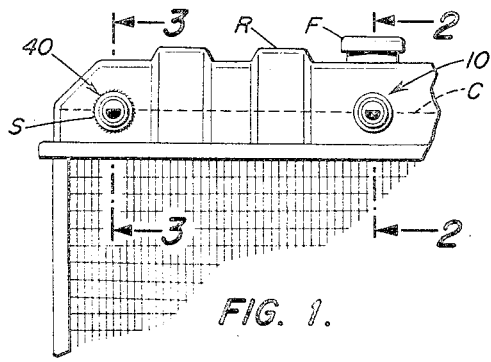
FIG. 1.
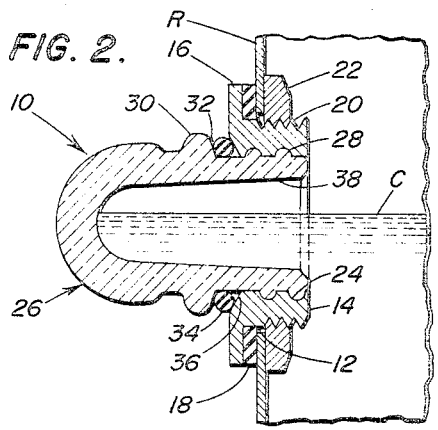
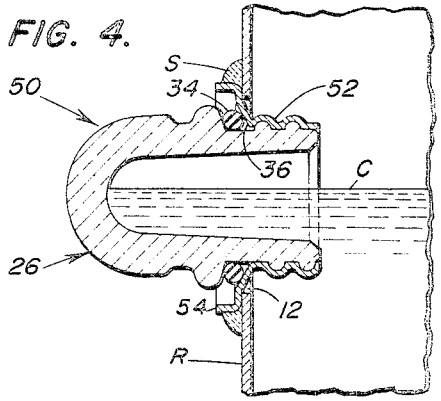
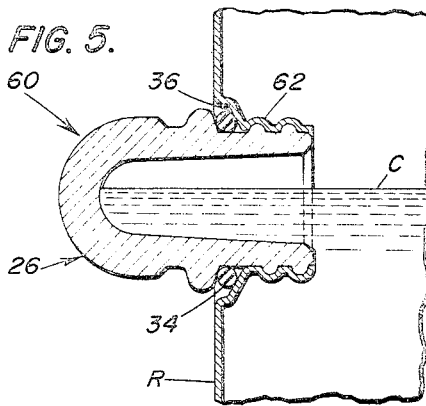
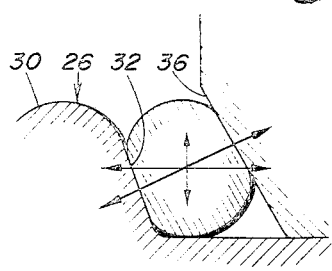
FIG. 7.
INVENTOR
THOMAS R. DEMYON
BY *Walter G. Finch*
ATTORNEY United States Patent Office 3,434,346
Patented Mar. 25, 1969

3,434,346
RADIATOR SIGHT GAUGES
Thomas R. Demyon, 6201 Loch Raven Blvd.,
Baltimore, Md. 21212
Filed Nov. 30, 1966, Ser. No. 598,075
Int. Cl. G01f 23/02
U.S. Cl. 73—334                                   3 Claims

ABSTRACT OF THE DISCLOSURE

The smooth rounded contours of parison-molded hemispherical sight glasses cause difficulties with the hermetic seals required for radiator sight gauges. This is solved in the here-disclosed improved sight gauges which employ ferrules that have sloped O-ring seats. These seats cooperate with the rounded beads of molded sight glasses when tightened to urge the O-ring inward.

---

This invention relates generally to measuring and testing devices, and more particularly it pertains to a removable transparent sight gauge for observing liquid level in containers such as automobile radiators.

In U.S. Letters Patent 3,248,946 and 3,277,713, are disclosed several versions of radiator sight gauges having removable globular glass elements. In practicing these inventions, it has been found desirable to make certain improvements.

Accordingly, it is an object of the present invention to provide improved, sealing means in threaded glass sight gauge assemblies.

Another object of this invention is to provide a liquid level gauge which is self-draining.

Still another object of this invention is to provide receiving nipples for securing sight gauges to a container wall which are more easily assembled to an existing structure.

To provide a more economical construction of sight gauge which uses fewer and simpler parts, is yet another object of the invention.

Other objects and attendant advantages of this invention will become more readily apparent and understood from the following detailed specification and single sheet of accompanying drawings in which:

FIG. 1 is a fragmentary front elevation of an automotive vehicle radiator showing typical mounting locations for a sight gauge of the present type incorporating features of this invention;

FIG. 2 is a section view taken on line 2—2 of FIG 1;

FIG. 3 is a section view taken on line 3—3 of FIG. 1;

FIG. 4 is a view similar to FIG. 3 but showing a nipple especially adapted for soft soldering installation;

FIG. 5 illustrates an embodiment of the invention which is especially applicable to original equipment manufacture;

FIG. 6 depicts another embodiment of the invention useful in containers having heavy walls; and FIG. 7 is a much enlarged cross section view illustrating the improved sealing arrangement for the sight gauge of present invention.

Globular sight gauge glasses are most economically made by parison molding which produces an article having much rounded contour. Square corners as for flanges and sharpened threads are impossible without subsequent costly grinding operations.

When flat gaskets do not seat well and O-rings become distorted from the usual techniques used with such sight gauges, leaks result and loosening is common under vibration conditions.

With reference to the drawings several embodiments of the invention will be described all using the economical parison-molded sight glass.

Where access to the interior of a radiator is possible through the filler or by removing a circulating hose, the sight gauge 10 shown in FIGS. 1 and 2 may be used. An aperture 12 is drilled in the wall of radiator R on the desired level of liquid C and a nipple 14 is inserted therein from the exterior. This nipple 14 is of metal and will accommodate a flat gasket 18 adequately against a sharply defined flange 16. A nut 22 is passed to the interior of the radiator R through the filler F or other access point and run up on the external threads 20 of the nipple 14. The internal threads 24 thereof receive the rounded threads 28 of the globular sight glass 26. A rounded circumferential flange 30 formed intermediate the ends of the sight glass 26 backs up on O-ring 34.

The O-ring 34 is urged into a conical recess or countersink 36 in the nipple 14. The angle of this countersink is made slightly different from that of the sloped face 32 of the glass flange 30 such that the O-ring 34 lies between diametrical walls comprising sloped face 32 and the countersink 36 diverging radially inwardly. The force vectors (arrows in FIG. 7, not necessarily scaler product) therefore resolve to retain the O-ring 34 rather than to wedge it outwardly.

It will be noted the improved sight glass 26 is made with a cavity 38 which tapers conically toward its open end so as to not retain some liquid C should the level thereof drop. Such a gauge 26 can be used in any liquid reservoir at any angle to give a proper indication of liquid level.

The embodiment of the sight gauge 40 of the invention shown in FIG. 3 is used where the installation is remote from filler F as shown on the left in FIG. 1. Sight gauge 40 in this particular installation of FIG. 3 would be advantageous where baffling internally in the radiator R or small entrance holes would make it difficult to get the nut 22 inside the radiator R for holding the sight gauge 40 in. It merely omits the gasket 18 and nut 22 of embodiment 10. Solder S (preferably brazing) is applied all around the flange 16 to secure and seal the nipple 14 to the wall of radiator R.

In FIG. 4, there is depicted another embodiment of the sight gauge 50 where a spun nipple 52 of thin metal is employed where it is necessary to use soft solder S to secure the nipple 52 to the wall of the radiator R. For this purpose, nipple 52 is additionally provided with a raised edge dam 54 to retain the solder S. This particular sight gauge 50 is preferably used where there is a thin wall fluid reservoir.

The biggest advantage of this sight gauge 50 is that because the adapter 52 used on the wall of the radiator R is thinner, it can therefore be made more economically and a conventional soldering process can be utilized to install the gauge 50 to the radiator R. As indicated, the adapter 52 is provided with the raised dam 54 on the outside to keep solder from entering into the adapter 52 during the soldering process. This adapter 52 also is provided with the previously mentioned countersink or angled surface 36 to give proper seating of the gasket or O-ring 34 by virtue of correct angles from the glass bulb 26 through the O-ring 34 to the angle on the adapter 52.

In FIG. 5, there is shown another embodiment of the sight gauge 60 wherein a nipple 62 is pressed from the material of the wall of radiator R. This integral modification of the sight gauge 60 is most suitable for original manufacture in the radiator factory.

Often times a globular sight gauge is desired in radiators R or other vessels where thick walls are provided. Such a sight gauge 70 is shown in FIG. 6 wherein no nipple is required, and it is only necessary to provide a suitable threaded hole 72 directly in the wall of the radiator R and the important special countersink 36 as previously described.

Such an installation of the sight gauge 70 has the advantages that it requires the addition of no extra parts and additionally does not require any soldering or brazing process.

Obviously many modifications and variations of the present invention are possible in light of the above teachings. It is, therefore, to be understood that the invention may be practiced otherwise than as specifically described.

What is claimed is:

1. In a sight gauge system for indicating the level of a fluid in a structural system having a wall for containing said fluid under pressure, an opening in a wall of the structural system, an O ring next to said opening, and a sight glass axially positioned in said opening and within said O ring and having an open end for receiving fluid in said structural system, the improvement comprising: a countersunk conical face on the wall of said opening, said sight glass having an annular flange with a sloping annular face on said annular flange in section diverging radially inwardly with respect to the face of the conical recess, whereby on increase in pressure within the system, the O ring is driven axially away from the said opening and is thereby more securely inserted between the sloping faces of said conical recess and said annular flange of said sight glass for sealing said slight glass to said annular means in said opening in said structural system.

2. The sight gauge system of claim 1, wherein said wall is of considerable thickness, with said conical recess being formed in said wall, said opening being internally threaded, and said sight glass having threads at its open end for engaging with said internally threaded opening in said wall.

3. A sight gauge as recited in claim 2, wherein said sight gauge is of a globular type.

References Cited

UNITED STATES PATENTS

| | | | |
|---|---|---|---|
| 572,818 | 12/1896 | Palmer | 220—46 X |
| 575,475 | 1/1897 | Fuller | 220—46 |
| 2,368,105 | 1/1945 | Berge | 220—82 |
| 3,251,335 | 5/1966 | Dannerik | 116—118 X |
| 3,277,713 | 10/1966 | Demyon | 73—334 |
| 3,335,607 | 8/1967 | Seekins | 73—334 |
| 2,374,142 | 4/1945 | Steven | 220—82.5 |
| 2,537,249 | 1/1951 | Walton. | |

FOREIGN PATENTS

| | | |
|---|---|---|
| 275,467 | 7/1913 | Germany. |
| 1,002,961 | 2/1957 | Germany. |

LOUIS R. PRINCE, *Primary Examiner.*

D. M. YASICH, *Assistant Examiner.*

U.S. Cl. X.R.

220—46